United States Patent [19]

Skinner et al.

[11] 3,873,725

[45] Mar. 25, 1975

[54] INSECT REPELLENT COMPOSITION CONTAINING $C_6$-$C_8$ ALKYL MONOETHERS OF TRIETHYLENE GLYCOL

[75] Inventors: W. A. Skinner, Portola Valley; Howard L. Johnson; Joseph T. DeGraw, Jr., both of Sunnyvale; Vernon H. Brown, Menlo Park, all of Calif.

[73] Assignee: The United States of America as represented by the Secretary of the Army, Washington, D.C.

[22] Filed: Jan. 29, 1973

[21] Appl. No.: 327,484

Related U.S. Application Data

[63] Continuation-in-part of Ser. No. 243,445, April 12, 1972, abandoned.

[52] U.S. Cl.............................. 424/342, 424/DIG. 10
[51] Int. Cl.............................................. A01n 9/24
[58] Field of Search............ 424/DIG. 10, 342, 339, 424/343

[56] References Cited

UNITED STATES PATENTS

| 2,293,256 | 8/1942 | Granett................................ 424/341 |
| 2,435,005 | 1/1948 | Huppke et al.............. 424/DIG. 10 |

OTHER PUBLICATIONS

Chemical Abstracts, Vol. 33 (1939), p. 8333[6].
Chemical Abstracts, Vol. 56 (1962), p. 636d.
Chemical Abstracts, Vol. 53 (1959), p. 9045a.

*Primary Examiner*—V. D. Turner
*Attorney, Agent, or Firm*—Donovan J. De Witt

[57] ABSTRACT

Topically applied compositions containing $C_6$-$C_8$ alkyl monoethers of triethylene glycol afford extended protection to man against attack by mosquitoes. Protection is also afforded by said compositions against other insects such as biting flies and the like.

2 Claims, No Drawings

INSECT REPELLENT COMPOSITION CONTAINING $C_6$-$C_8$ ALKYL MONOETHERS OF TRIETHYLENE GLYCOL

The invention herein described was made in the course of or under a contract with the Department of the Army, U.S. Army Medical Research and Development Command.

RELATED APPLICATION

This application is a continuation-in-part of application, Ser. No. 243,445, filed Apr. 12, 1972 now abandoned.

SUMMARY OF THE INVENTION

It has been discovered that $C_6$-$C_8$ alkyl monoethers of triethylene glycol are capable of giving extended protection to man against attack by insects such as mosquitoes and the various biting flies when applied topically to the skin in a suitable formulation. For example, application of these monoether compounds to the human skin gives protection against mosquito bites for periods which usually are significantly longer than those provided by the widely used mosquito repellent DEET (N,N-diethyl-m-toluamide) at the same level of application.

The active insect repellent compounds employed in the practice of the present invention are alkyl monoethers of triethylene glycol having the structural formula $HO(CH_2CH_2O)_3$—$R$, where R represents a straight or branched chain alkyl group containing from about 6 through 8 carbon atoms. Representative R groups which can be effectively employed, include, for example, n-hexyl, n-heptyl, n-octyl, 4-methylpentyl, and 2-ethylhexyl. For convenience of description, these active alkyl triethylene glycol monoether compounds will be referred to as alkyl monoether compounds or simply as monoether compounds.

These alkyl monoether compounds are liquids which are insoluble in water and readily soluble in organic solvents such as methanol, ethanol, isopropanol, acetone, methylene chloride and ethyl acetate, for example. In a typical preparation, 10.75 g (0.25 mole) of sodium hydride as a 56% suspension in mineral oil are gradually added to 150 g (1.0 mole) of cold triethylene glycol. The resulting foamy mixture is stirred for 45 minutes at ambient temperature, then heated for 15 min on the steam bath. The mixture is then cooled in an ice bath and 43.0 g (0.26 mole) of n-hexyl bromide are added dropwise, followed by heating at 95°–100° C for 21 hours. The mixture is cooled, diluted with one liter of water and extracted with two 200 ml portions of methylene chloride. The extract so obtained is dried over anhydrous magnesium sulfate and evaporated under vacuum. The residual liquid is fractionated through a Vigreux column to afford 13.5 g (23%) of clear liquid, bp 125°–128°/0.55 mm, which is found to be hexyl triethylene glycol monoether.

The insect repellent compositions of the present invention contain an amount of the active alkyl monoether compound which, in the form said composition is applied, will provide the desired insect repellency. For any given active compound, the optimum amounts to be employed will vary from one insect to another, as well as with the environmental conditions and the nature of the vehicle associated with the active compound. However, it has been found that for the control of mosquitoes and similar small biting insects, good results can be obtained with compositions which, in normal usage, are adapted to provide a concentration on the human skin of at least about 0.2 mg of the active compound per square inch of skin surface (0.2 mg/in.$^2$), with a preferred concentration being at least about 1 mg/in.$^2$. The amounts of the active compound (or compounds) in the composition can range upwardly to about 5 mg/in.$^2$, or even higher, without giving rise to any undesirable effect on the skin. Amounts larger than this, e.g., 20 mg/in.$^2$, though useful, may afford no further added benefits.

In one manner of formulating compositions which are useful in combating mosquito attacks, the active alkyl monoether compounds can be dissolved in a solvent vehicle which readily evaporates following topical application of the solution. Here the practice is to employ concentrations of the compound in the vehicle such as to provide the skin with from about 0.1 to 5 mg/in.$^2$ of the active compound. A similar application level of the active ingredient is preferably observed when the active material is compounded in an oleaginous vehicle or in an ointment of the vanishing cream type. When the active compound is admixed with materials which form a protective polymeric film over the skin on topical application thereto, the composition may contain amounts of the active compound such as to provide a somewhat larger concentration thereof on or adjacent the skin, e.g., 5 to 20 mg per square inch of skin surface.

The active alkyl ether compounds hereof also constitute an effective repellent for mosquitoes and other insects even when applied topically to the skin in neat form. However, this is a relatively expensive and impractical method since it is difficult to provide a uniform coating of the compound over the skin in the concentrations referred to above, e.g., 0.1 to 20 mg/in.$^2$.

Useful compositions of the present invention can be formulated by employing the active alkyl ether compounds in connection with relatively low boiling solvents such as acetone, methylene chloride, ethanol, isopropanol and the like, or with somewhat higher boiling liquids such as vegetable oils or highly treated, white, odorless, non-viscous mineral oil fractions. Solutions of this character are adapted to be employed either as hand-applied liquid compositions or in the form of aerosol spray compositions.

As creams and lotions the alkyl monoether compounds may be formulated with diluents such as ethanol, glycerin or water in combination with various oils, suspending agents such as gum arabic, bentonite, sodium alginate, methyl cellulose, etc., and hydrophilic bases containing propylene glycol, cetyl alcohol, polyethylene glycols, etc. in combination with surfactants such as sodium lauryl sulfate, dioctyl sodium sulfosuccinate, polyoxyethylene sorbitan monooleates or other emulsifying components.

Particularly good results, from the standpoint of obtaining protection intervals extending over one or more days, can be obtained when the active monoether compound is incorporated in a liquid which, on application to the skin (usually in aerosol spray form), rapidly sets to form a thin polymeric film layer as the solvent portion of the formulation evaporates. Formulations of this character are well known in the art and are described, for example, in U.S. Pat. No. 2,804,073, to Galdenne et al, issued Aug. 27, 1957. They serve to incorporate the active ingredients in a tough, elastic, transparent film which is non-toxic, chemically inert and insoluble in body fluids. Such films, while resistant to water, are generally permeable to moisture vapor and to those of the active ether compound described herein. Thus, on being formed on the skin these films slowly release the ether vapors to the atmosphere while providing an environment above the skin which extends by several fold the protection period otherwise afforded by the active compound as when applied in a readily vaporizable solvent, for example. As has been indicated above, the preferred practice in working with film-based compositions of this character is to incorporate a somewhat larger concentration of the active compound than would otherwise be the case given the same level of application of the composition.

Many of the film-forming compositions adapted for use with the active monoether compound to form the insect repellent compositions hereof contain a film-forming component, per se, optionally along with other materials such as adhesion producers, plasticizers and the like, together with a volatile solvent. Exemplary film-forming components are those of the class consisting of vinylidine polymers (including, for example, vinyl chloride-vinyl component copolymers, vinyl chloride-vinyl acetate copolymers and carboxylated or hydroxylated modifications of such copolymers, vinyl chloride-butadiene polymers, vinyl butyral polymers, and vinyl acetate polymers), as well as polyacrylic and polymethacrylic esters and polyesters, cellulose acetate butyrate, ethyl cellulose, and compatible combinations thereof. The adhesion producing component, when present, may be a resin such as glycerol phthalate, abietic acid-glycerol and organic acid and/or phenol modifications thereof, amine-aldehyde resins, and resins containing maleic anhydride or phenols, including cresols. Any plasticizer employed may be a monomeric substance such as dioctyl phthalate, butyl phthallyl butyl glycolate, di-2(ethyl-hexyl) azelate, acetylated castor oil, phthalic anhydride-vegetable oil derivatives, tricresyl phosphate and o- and p-toluene sulfonamides or a polymeric substance such as chlorinated paraffin, cumarone-indene, sebacic acid polymers, and various vegetable oils treated to produce compatibility with film-formers.

Satisfactory volatile solvents for the above film-forming compositions include one or a combination of such solvents as ethyl acetate, acetone, diethyl ether, toluene, or methylene chloride. The solvent component is chosen to produce the desired drying rate and viscosity of liquid composition with regard to method of application and ease of storage. Such a solution may be post-emulsified, if desired, by the addition of appropriate emulsifying agents, anti-foaming agents, and water. When volatile solvents are used, the drying time of the film can be easily controlled, and is usually of the order of five minutes, while with application of the coating in the form of a water emulsion, this time may be increased, if desired, to about fifteen minutes or more. A satisfactory method for preparing the film-forming compositions comprises adding the film-forming component slowly to the solvent, with agitation, followed by the addition of the active ether compound and of any other plasticizing, adhesive or other components to be employed in the composition. After filtration to remove any suspended foreign material, the liquid composition can be packaged for application to the skin either in the liquid form, as by the hand, swab, or the like, or in the form of an aerosol spay.

As indicated above, the film-forming compositions can be emulsified with a suitable emulsifying agent, an anti-foaming agent and water. A protective colloid and a thickener may also be added, if desired. Satisfactory emulsifying agents for this purpose are the commercially available non-ionic, anionic or cationic surface active agents. The protective colloid added is selected from such substances as methyl cellulose, carboxymethyl cellulose, polyvinyl alcohol, "solubilized" protein, etc., of such grades as will produce the desired viscosity in the completed composition depending upon the requirements of method of application and use. The liquid compositions of the present invention are stable and non-oxidizing, and if spray application is desired, can be of the requisite low viscosity.

DESCRIPTION OF PREFERRED EMBODIMENTS

The following examples are illustrative of the invention but are not to be construed as limiting.

EXAMPLE 1

An area of the human forearm is cleaned with ethanol and a 2% by weight solution of n-hexyl ether of triethylene glycol in acetone is evenly applied with a cotton swab to the cleansed arm area. The amount of solution applied in this fashion provides a concentration of 2 mg of the active ether compound per square inch of skin surface (2 mg/in.$^2$). Under ambient conditions of temperature, the treated arm, shielded to allow exposure to mosquito attack on only the treated area, is inserted into a cage of 500 female mosquitoes of the species *Aedes aegypti*, non-blood fed. The arm is maintained in the cage for 1 minute each half-hour, and the experiment is terminated on failure as evidenced by one mosquito bite or by one or more bites on the following exposure.

In a comparative run, conducted under the same conditions, the commercial DEET compound is employed in lieu of the hexyl ether of triethylene glycol. It is found, based on an average of four replicates, that DEET gives a mean protection time of 3.8 hours, while that afforded by the hexyl ether of triethylene glycol is 13.6 hours.

EXAMPLE 2

The procedure of Example 1 is repeated, but with the cage of mosquitoes being maintained at elevated (38°C.) rather than under ambient (24°C.) conditions, and with the arm being exposed to mosquito attack every few minutes rather than at half-hourly intervals. Here the DEET is found to provide a protection period of 38 minutes, while the triethylene glycol n-hexyl ether provides full protection for 66 minutes.

EXAMPLE 3

At 11.5% by weight solution of a film-forming composition in a mixed ethyl acetate-acetone solvent (a solution marketed by Parke Davis & Company as its Vibisate Plastic Bandage product and containing 8.2% of a copolymer of hydroxy-vinyl chloride-acetate and sebacic acid, 2.7% modified maleic resin ester and 0.6% glycolate plasticizer) is admixed with an amount of the triethylene glycol n-hexyl ether equal to 25% by weight of the film-forming composition present in the solution. The resulting solution is swabbed onto the clean test surface of the arm, following which the solvent rapidly evaporates leaving the skin covered by a thin film providing 40 mg of the film-forming solids and 10 mg of the active ether compound for each square inch of the arm portion under test. The coated arm was allowed to thoroughly dry for a period of 3 to 5 hours without being washed or rubbed by the clothing, after which the subject went about his normal business. At the end of approximately 24 hours following application of the coating material, the arm was inserted, every 2 to 3 hours, for 1 minute into a cage of mosquitoes similar to that described in Example 1. It was found that the protection period provided by the applied film against any biting by the mosquitoes was greater than 41 hours, as measured from the time of applying the wet coating solution.

EXAMPLE 4

The skin coating composition of Example 3 is applied to the skin area under test (10 sq. in.) and allowed to dry in place thereon for 15 minutes. The test method then employed is one which represents an accelerated test providing an appreciation of the mosquito protection time which the coating would provide under moist conditions such as those wherein the subject is perspiring heavily, for example. The test involves first flooding the coated skin area with water at 30°C. at a rate of 2 liters per minute, for 15 minutes. This is followed by a short period wherein the now dry arm portion is inserted within the cage of mosquitoes, as described in Example 1, to determine if protection is still intact. Thereafter, if no mosquito bites are experienced, the arm is flooded for 5 minutes with water at the same temperature and application rates as described above. This is followed by another period of exposure to the mosquitoes, with the arm being subjected to another 5 minutes of water flooding should the protection against mosquitoes still be found to be complete. This sequence of operation is continued until one or more mosquito bites are obtained. The test results are expressed in terms of the total minutes of water flooding employed up to the time when biting occurred. Thus in the case of the composition applied in this example, the protection time afforded is less than 15 minutes. In other words, the protection against mosquito attack was complete after the initial 10 minutes of water flooding, but broke down during the ensuing 5 minute water flooding period.

EXAMPLE 5

In this operation, conducted in a manner similar to that of Example 4, the triethylene glycol n-hexyl ether is admixed with a film-forming solution in the proportion of one part of the ether to four parts, by weight, of the film-forming ingredients present in the solution. The composition of the latter is 10% of a film former (Union Carbide's product VAGH) made up of hydroxylated vinyl chloride (91%) — vinyl acetate (3%) and 6% of hydroxyl function, together with 5% dioctyl phthalate plasticizer, 5% phenolic resin adhesive (Rohn & Haas product Amberol 801) and 80% of a methylene chloride solvent. Under the severe water-washing conditions of this test, the protection period afforded against mosquito attack is less than 20 minutes.

EXAMPLE 6

The procedure of Example 5 is repeated except that here the formulation contains 2% of the dioctyl phthalate plasticizer and 83% of the solvent. The protection period afforded by this composition is less than 30 minutes.

EXAMPLE 7

The procedure of Example 5 is repeated except that here the formulation contains no plasticizer and 85% of the solvent. The protection period afforded by this composition is less than 50 minutes.

EXAMPLE 8

This operation is conducted in a manner similar to that of Example 5, except that the composition of the film-forming solution is 10% of a film-former made up of a vinyl acetate-vinyl pyrrolidone copolymer (G.A.F.'s product Kalima-75), together with 4% of dioctyl phthalate plasticizer, 4% of the Amberol 801 adhesive, 10% isopropanol and 72% methylene chloride. Further, somewhat shorter successive water-washing periods were employed than the 10 minutes, 5 minutes, etc. sequence described in Example 4, in order to refine the order of magnitude of the effective protection period. The protection period afforded against attack by this composition is less than 10 minutes.

EXAMPLE 9

The operation of Example 8 is repeated, except that here the dioctyl phthalate is omitted, the Amberol 801 is employed in the amount of 2%, and the content of methylene chloride is increased to 78%. The protection time afforded by this composition is less than 10 minutes.

EXAMPLE 10

The operation of Example 9 is repeated, but with a film-forming solution made up of 5% of the VAGH product and 5% of Kalima-75 as a film-forming component, 4% of the Amberol 801 material, 5% isopropanol and 81% methylene chloride. The protection period afforded by this composition is less than 10 minutes.

EXAMPLE 11

The operation of Example 9 is repeated, but with a film-forming composition containing 10% of the VAGH product, 5% dioctyl phthalate and 85% $CH_2CL_2$. The protection period afforded by this composition is less than 8 minutes.

EXAMPLE 12

The operation of Example 9 is repeated, but with a film-forming solution made up of 10% Kalima-75, 4% dioctyl phthalate, 10% isopropanol and 76% methylene chloride. The protection period afforded by this composition is less than 8 minutes.

EXAMPLE 13

The operation of Example 9 is repeated, but with a film-forming solution made up of 5% VAGH, 5% Kalima-75, 5% dioctyl phthalate, 5% isopropanol and 80% methylene chloride. The protection period afforded by this composition is less than 13 minutes.

EXAMPLE 14

This operation is conducted in the same manner as cited above in Example 1 except that here the solution applied to the skin is one containing 50 parts of the triethylene glycol n-hexyl ether compound, 25 parts corn oil, and 25 parts ethanol. Further, the concentration of the active hexyl ether compound on the skin is 1 mg/in.$^2$ rather than 2 mg/in.$^2$. The protection period afforded by this composition, even at the reduced concentration, is 4.5 hours.

EXAMPLE 15

The operation of Example 1 is repeated, but using various active monoether compounds, as well as DEET, all dissolved in ethanol, and with a different batch of the *Aedes aegypti* mosquitoes. The DEET gave an average protection time (4 replicates) of 8.8 hours. With the n-hexyl monoether of triethylene glycol, the average protection time (3 replicates) was 13.7 hours. With the n-heptyl monoether of triethylene glycol, the average protection time (2 replicates) was 14.8 hours. With the n-octyl monoether of triethylene glycol, the average protection time (3 replicates) was 14.5 hours.

EXAMPLE 16

The operation of Example 1 is repeated, but with active monoether compounds being employed at a level of 1 mg/in.$^2$ rather than 2 mg/in.$^2$. It was found that with the n-hexyl monoether of triethylene glycol, the average protection time was about 7.5 hours. Using the isomer compound, 4-methylpentyl monoether of triethylene glycol, the protection time was about 7 hours. Using the 2-ethylhexyl monoether of triethylene glycol, the average protection time afforded was at least 13 hours.

EXAMPLE 17

The active n-hexyl ether of triethylene glycol is tested in this operation to determine its efficacy as a fly repellent when applied to animal skin. In carrying out the test, a 5 × 10 cm area is shaved on the abdomen of a guinea pig and the test compound, dissolved in 95% ethyl alcohol is applied in the amount of 0.5 ml to the shaved area of the guinea pig which is restrained on its back in a holder. Three hours after application of the test composition, a screen wire cage containing 20–30 stable flies (*Stomoxys calcitrans*), starved for approximately 20 hours before use, is placed on the treated abdominal area. The flies are left in place for 5 minutes and the number of bites recorded. The fly biting data so obtained are then converted into a Biting Index, which shows the total number of bites which would have been obtained had 100 flies been used in the test, over the 5 minute test period. In the control test, where only ethyl alcohol is applied to the skin, the Biting Index obtained is 188. Using an ethanol solution containing 8% of the hexyl ether compound (representing the application of 0.8 mg of active chemical per square centimeter of skin) the Biting Index has a value of 32, this representing an 83% reduction in the Index as compared with the control. Using a 4% solution of the active hexyl ether compound, the Biting Index is 48, representing a 70% reduction in the Index as compared with the control.

We claim:

1. A method of protecting man against attack by mosquitoes which comprises topically applying to exposed skin areas a mosquito-repelling amount of n-hexyl monoether of triethylene glycol.

2. A method of protecting man against attack by mosquitoes which comprises topically applying to exposed skin areas a mosquito-repelling amount of n-heptyl monoether of triethylene glycol.

* * * * *